United States Patent

Pall et al.

[11] Patent Number: 5,431,829
[45] Date of Patent: Jul. 11, 1995

[54] POLYMETHYLPENTENE FILTRATION MEDIUM

[75] Inventors: David B. Pall, Roslyn Estates; Colin F. Harwood, Glen Cove; Isaak Vasserman, Rosyln Heights, all of N.Y.

[73] Assignee: Pall Corporation, East Hills, N.Y.

[21] Appl. No.: 169,334

[22] Filed: Dec. 16, 1993

[51] Int. Cl.$^6$ .............................................. B01D 29/66
[52] U.S. Cl. ..................................... 210/791; 210/505
[58] Field of Search ................ 210/767, 505, 506, 507, 210/490, 440, 443, 457, 791

[56] References Cited

U.S. PATENT DOCUMENTS

| | | |
|---|---|---|
| 3,811,957 | 5/1974 | Buntin . |
| 3,849,241 | 11/1974 | Buntin et al. . |
| 3,900,027 | 8/1975 | Keedwell ............................ 128/268 |
| 3,933,557 | 1/1976 | Pall . |
| 3,972,759 | 8/1976 | Buntin . |
| 3,978,185 | 8/1976 | Buntin et al. . |
| 4,021,281 | 5/1977 | Pall . |
| 4,048,364 | 9/1977 | Harding et al. . |
| 4,116,738 | 9/1978 | Pall . |
| 4,415,608 | 11/1983 | Epperson et al. . |
| 4,594,202 | 6/1986 | Pall et al. . |
| 4,726,901 | 2/1988 | Pall et al. . |
| 4,803,117 | 2/1989 | Daponte . |
| 4,804,577 | 2/1989 | Hazelton et al. . |
| 4,874,399 | 10/1989 | Reed et al. . |
| 4,874,447 | 10/1989 | Hazelton et al. . |
| 4,880,548 | 11/1989 | Pall et al. . |
| 4,904,520 | 2/1990 | Dumas et al. . |
| 4,923,620 | 5/1990 | Pall . |
| 4,925,572 | 5/1990 | Pall . |
| 4,936,934 | 7/1990 | Buehning . |
| 4,944,854 | 7/1990 | Feltone et al. . |
| 4,976,861 | 12/1990 | Pall . |
| 5,073,436 | 12/1991 | Antonacci et al. . |
| 5,112,048 | 5/1992 | Kienle . |
| 5,169,712 | 12/1992 | Tapp . |
| 5,173,356 | 12/1992 | Eaton et al. . |
| 5,208,098 | 5/1993 | Stover . |
| 5,217,627 | 7/1993 | Pall et al. . |
| 5,229,012 | 7/1993 | Pall et al. . |
| 5,244,482 | 9/1993 | Hassenboehler, Jr. et al. . |
| 5,258,127 | 11/1993 | Gsell et al. . |

FOREIGN PATENT DOCUMENTS

WO92/05305 4/1992 WIPO .

OTHER PUBLICATIONS

TPX® Brochure (Mitsui Petrochemical Industries, Ltd.).
Polymethylpentene-Polymethylpentene Characteristics Sheet.
Buntin et al., "Melt Blowing—A One Step Web Process for New Nonwoven Products," *TAPPI*, 56(4), 74–77 (1973).

*Primary Examiner*—Frank Spear
*Attorney, Agent, or Firm*—Leydig, Voit & Mayer, Ltd.

[57] ABSTRACT

The present invention provides a filtration medium comprising a fibrous mass of nonwoven polymethylpentene fibers. Moreover, a filter element comprising the aforesaid fibrous mass of nonwoven polymethylpentene fibers surrounding a perforated, hollow, cylindrical tube is also provided. The present invention further provides a filter cartridge which comprises a housing and the aforesaid filter element.

14 Claims, No Drawings

POLYMETHYLPENTENE FILTRATION MEDIUM

TECHNICAL FIELD OF THE INVENTION

The present invention relates to a filtration medium. More particularly, the present invention relates to a nonwoven fibrous filtration medium comprising polymethylpentene.

BACKGROUND OF THE INVENTION

A typical fluid treatment filter element, for many uses, comprises a hollow, generally cylindrical, permeable filter element with appropriate end caps to direct a fluid, e.g., a gas or liquid, through the filter medium of the filter element.

The fluid to be treated is generally forced to flow inwardly from the exterior to the interior of such a fluid treatment element, although there is no requirement that such be the case. It should be noted that irrespective of the normal flow of fluid through the fluid treatment element, it is not unusual to have the fluid flow reversed, either accidentally (e.g., due to a surge in fluid pressure downstream from the filter element) or intentionally (e.g., to flush an accumulated cake of particulate matter from the surface of the filter element).

Certain filters are specifically designed to withstand such a reversal of fluid flow. Such filters are commonly referred to as backwashable, or septa, filters. Regardless of the particular application of the filter, e.g., petrochemicals, pharmaceuticals, electronics, or food and beverage preparation, the common feature of such filters is that they must be able to withstand a strong flow in the reverse direction (backwashing) without experiencing a loss in integrity. In addition to maintaining their integrity, such filters should also be resistant to chemical attack in order to be useful over a wide range of applications.

In an effort to address the aforesaid concerns, those in the art turned to filters prepared from stainless steel. Such porous stainless steel filters, however, have several significant disadvantages: they are very expensive, they clog quickly upon use and therefore provide short cycle times, and are difficult to dispose of after use.

In view of the disadvantages associated with stainless steel filters, the use and development of non-metallic, backwashable filters, particularly nonwoven fibrous filtration media, has been on the rise. One such filter is prepared using polypropylene fibers which are wound onto a porous core. Alternatively, such filters are prepared using a fiber impingement process which allows greater control of the fiber diameter and structure of the media prepared from such polypropylene fibers.

Polypropylene backwashable filters, however, possess several disadvantages. Those disadvantages include: the inability to be used in applications where the filter contacts oils or heated liquids such as boiling water, the inability to be used in high temperature applications due to its relatively low melting point (175° F.), and the need for a suitable porous support layer to be wrapped about the polypropylene fibers so that the polypropylene can withstand backwashing without damage. Such an exterior protective material or outerwrap is typically comprised of a metal mesh, such as of aluminum or stainless steel, although a plastic mesh or nonwoven material has also been used. However, the outerwrap presents yet another component of the filter which, depending upon its composition, can degrade or be otherwise damaged upon exposure to the fluid to be filtered.

In view of the foregoing, there remains a need for a filtration medium which is not readily damaged during backwashing, even in the absence of a porous support layer about the outer surface of the medium, can withstand exposure to high pressure drops of high-temperature liquids (in excess of 100° C.), possesses superior resistance to solvents, including oils, and which is nonetheless economical to manufacture and utilize.

It is an object of the present invention to provide such a filtration medium, as well as a filter element and cartridge which comprises such a filtration medium. These and other objects and advantages of the present invention, as well as additional inventive features, will be apparent from the description of the invention provided herein.

BRIEF SUMMARY OF THE INVENTION

The present invention provides a filtration medium which comprises a fibrous mass of nonwoven polymethylpentene fibers. Moreover, a filter element comprising the aforesaid fibrous mass of nonwoven fibers surrounding a perforated, hollow, cylindrical tube is also provided. The present invention further provides a filter cartridge which comprises a housing and the aforesaid filter element.

DETAILED DESCRIPTION OF THE PREFERRED EMBODIMENTS

The present invention provides a filtration medium comprising a fibrous mass of nonwoven polymethylpentene fibers. The present inventive filtration medium is superior to conventional metallic and nonmetallic filtration media in that it is not readily damaged during backwashing, even in the absence of a porous support layer about the outer surface of the filtration medium, e.g., surrounding the filtration medium when configured into a cylindrical filter element. Moreover, the present inventive filtration medium can withstand exposure to high-temperature liquids (in excess of 100° C.), possesses superior resistance to solvents, including oils, and is economical to manufacture and utilize.

The polymethylpentene material used to prepare the filtration medium of the present invention comprises a polymer of 4-methyl pentene-1. The present invention contemplates the use of derivatives thereof to the extent that such derivatives are able to be formed into fibers useful in the preparation of a suitable filtration medium. Polymethylpentene is commercially available under the trademark TPX ® from Mitsui Petrochemical Industries, Ltd. The use of Grade DX820 of the TPX ® polymer is preferred in the context of the present invention. Polymethylpentene is also commercially available from Phillips 66.

The present inventive filtration medium comprises a fibrous mass of nonwoven polymethylpentene fibers prepared in accordance with any suitable procedure. Fiber forming procedures are well known and readily appreciated by those of ordinary skill in the art. The fibers may be of any suitable diameter and density, depending on the desired filtration characteristics of the filtration medium, as is also well known in the art. For example, the filtration medium may be prepared from relatively uniform fibers throughout the filtration medium so as to have a relatively uniform pore structure, or the filtration medium may be comprised of discrete layers or a continuous series of fibers of varying diameter which are layered upon themselves to form a filtration medium of a graded pore structure, preferably such that the pores of the filtration medium are smaller in the direction of normal fluid flow (rather than in the direction of fluid flow during backwashing). See, for example, U.S. Pat. Nos. 4,594,202 and 4,726,901.

The melt-blowing technique for forming the polymethylpentene fibers directly into a filtration medium is especially preferred in the context of the present invention. The reason such a technique is preferred is because, once the fibers have cooled, the fibers are relatively inflexible. Thus, the most preferred filtration medium of the present invention is prepared by melt-blowing the polymethylpentene fibers such that they impinge and are collected on a suitable collector in a manner in which directly forms the nonwoven fibrous filtration medium. See, for example, U.S. Pat. Nos. 3,933,557, 4,021,281, and 4,116,738. The filtration medium is then allowed to cool by any suitable means, including merely exposing the filtration medium to ambient temperatures, after which it is allowed to stand for a sufficient length of time to develop its full strength, e.g., for about 8–12 hours or more. The resulting filtration medium exhibits sufficient stiffness and inflexibility that no support material is required to surround the inner or outer surfaces of the filtration medium during use, including backwashing.

The present inventive filtration medium can have any suitable pore rating. Similarly, the present inventive filtration medium can have any suitable void volume. The preparation of nonwoven fibrous filtration media with particular pore ratings and void volumes is well within the ordinary skill in the art. As void volume increases, however, the filtration medium becomes less rigid and more susceptible to damage during use, particularly backwashing, in the absence of suitable support materials. The void volume of the present inventive filtration medium is preferably less than about 80%, more preferably less than about 78%, and most preferably about 60% to about 75%. At void volumes most typical for backwashable or septa filtration media, e.g., 72%±2% (about 70% to about 74%), the present inventive filtration medium is surprisingly more rigid than, and less susceptible to crushing or other deformation as compared to, the corresponding conventional polypropylene filtration medium (which is commercially available from Pall Corporation).

The present invention further provides a filter element comprising the present inventive filtration medium surrounding a hollow, cylindrical, foraminous tube, which may also have, for example, perforated walls. The preparation of such a filter element comprising such a tube can be accomplished by any suitable method, such methods being well known and readily appreciated by those of ordinary skill in the art. Examples of such methods which are suitable for the preparation of a filter element include providing polymethylpentene fibers by any suitable technique, such as melt-blowing, and surrounding the perforated, hollow, cylindrical tube with such fibers by any suitable method, e.g., string winding the fibers about the tube, applying the fibers onto a surface such that a sheet of nonwoven fiber is formed and wrapping and securing same about the tube, or, preferably, forming a mass of nonwoven fibers directly on the cylinder (which functions as the collector surface) by melt-blowing and fiber impingement. In addition to the advantages discussed above with respect to the preparation of the filtration medium, the use of melt-blowing and fiber impingement allows for increased control over fiber size and laydown structure as compared to string winding. Such methods are well known to those of ordinary skill and, as such, are able to be readily applied to polymethylpentene.

The hollow cylindrical tube or core is primarily included to facilitate the preparation of the filtration medium and to provide internal support for the filtration medium. The tube may comprise any suitable material which is porous to the fluid being filtered and which advantageously does not substantially add to the pressure drop across the filter element. Preferably, the tube is of a perforated or fenestrated metal construction, e.g., aluminum or stainless steel, but may also be made from a suitable polymer, particularly polymethylpentene. The cylindrical tube should be selected so as to provide adequate support during filtration, as well as possible backwashing of the fluid treatment element. The cylindrical tube configuration and material should also be selected, of course, so as to ensure that there is no adverse interaction with either the fluid to be filtered or the filtration medium.

The precise tube composition and filter sizing parameters, as well as other parameters considered in the preparation of an operational filter element, are well known and may be readily selected by those of ordinary skill in the art for particular end-uses.

The filter element of the present invention may further be enclosed within a housing such that a filter cartridge is formed. Housing configurations, materials therefor, and methods for their preparation, are well known to, and appreciated by, those of ordinary skill in the art.

The present inventive filtration medium and related filter element and filter cartridge may be used in a variety of applications, including, but not limited to, those applications which require sterilization of the filter by steam or boiling water, such as in the health and medical arts and in pharmaceutical preparation, the filtration of boiler (e.g., condensate) water in electric power and steam generating plants, the filtration of sugar juices and syrups, the filtration of potable water supplies, the treatment of waste water, the treatment of contaminated gases such as air, and the filtration of pharmaceutical compositions and the like. Such filtration may be completed by passing the appropriate fluid through the filtration medium, filter element, or filter cartridge of the present invention.

All of the patents cited herein are hereby incorporated in their entireties by reference.

While this invention has been described with an emphasis upon preferred embodiments, it will be obvious to those of ordinary skill in the art that variations of the preferred products and methods may be used and that it is intended that the invention may be practiced otherwise than as specifically described herein. Accordingly, this invention includes all modifications encompassed within the spirit and scope of the invention as defined by the following claims.

What is claimed is:

1. A filtration medium comprising a fibrous mass of nonwoven polymethylpentene fibers, wherein the fibrous mass has a void volume of less than about 78% and the entangled and sufficiently inflexible so that the fibrous mass can withstand backwashing without sustaining any loss in integrity in the absence of any external support for the fibrous mass.

2. The filtration medium of claim 1, wherein said filtration medium has a void volume of about 70% to about 74%.

3. A filter element comprising a perforated, hollow, cylindrical tube and a fibrous mass of nonwoven polymethylpentene fibers which surrounds said tube, wherein the fibrous mass has a void volume of less than about 78% and the polymethylpentene fibers in the fibrous mass are sufficiently entangled and sufficiently inflexible so that the fibrous mass can withstand backwashing without sustaining any loss in integrity in the absence of any external support for the fibrous mass.

4. The filter element of claim 3, wherein the nonwoven fibers are string-wound on said tube.

5. A filter cartridge comprising a housing and the filter element of claim 4.

6. The filter element of claim 3, wherein the nonwoven fibers are formed directly on said tube.

7. The filter element of claim 6, wherein said fibrous mass of nonwoven polymethylpentene fibers has a void volume of about 70% to about 74%.

8. A filter cartridge comprising a housing and the filter element of claim 7.

9. A filter cartridge comprising a housing and the filter element of claim 6.

10. The filter element of claim 3, wherein the nonwoven fiber mass has an outer surface which is not surrounded by a support therefor.

11. A filter cartridge comprising a housing and the filter element of claim 10.

12. A filter cartridge comprising a housing and the filter element of claim 3.

13. A method of treating a fluid comprising passing a fluid to be treated through a filtration medium comprising a fibrous mass of nonwoven polymethylpentene fibers, wherein the fibrous mass has a void volume of less than about 78% and the polymethylpentene fibers in the fibrous mass are sufficiently entangled and sufficiently inflexible so that the fibrous mass can withstand backwashing without sustaining any loss in integrity in the absence of any external support for the fibrous mass.

14. The filter element of claim 16, wherein said fibrous mass of nonwoven polymethylpentene fibers has a void volume of about 70% to about 74%.

* * * * *

UNITED STATES PATENT AND TRADEMARK OFFICE
CERTIFICATE OF CORRECTION

PATENT NO. : 5,431,829
DATED : JULY 11, 1995
INVENTOR(S) : DAVID B. PALL, COLIN F. HARWOOD AND ISAAK VASSERMAN

It is certified that error appears in the above-identified patent and that said Letters Patent is hereby corrected as shown below:

ON THE TITLE PAGE:

Item: [56] References Cited

U.S. PATENT DOCUMENTS

Second column, first line, "Feltone et al." should read -- Felton et al. --.

Column 4, line 65, after "and the" insert -- polymethylpentene fibers in the fibrous mass are sufficiently --; and Column 6, line 21, delete "claim 16" and substitute therefor -- claim 13 --.

Signed and Sealed this

Tenth Day of October, 1995

*Attest:*

BRUCE LEHMAN

*Attesting Officer*       *Commissioner of Patents and Trademarks*